TWO-REGISTER CALCULATOR FOR PERFORMING MULTIPLICATION AND DIVISION USING IDENTICAL OPERATIONAL STEPS

Filed Jan. 9, 1962 4 Sheets-Sheet 1

INVENTOR.
WILLIAM H. BURKHART
BY Charles L. Johnson Jr.
ATTORNEY

May 3, 1966 W. H. BURKHART 3,249,745
TWO-REGISTER CALCULATOR FOR PERFORMING MULTIPLICATION AND DIVISION USING IDENTICAL OPERATIONAL STEPS
Filed Jan. 9, 1962 4 Sheets-Sheet 2

MAJOR TIMING CONTROL SIGNALS NONRESTORING

INVENTOR.
WILLIAM H. BURKHART
BY Charles L. Johnson Jr.
ATTORNEY

INVENTOR.
WILLIAM H. BURKHART
BY Charles L. Johnson Jr.
ATTORNEY

FIG. 12

EXAMPLE OF MULTIPLICATION

| | | | | | | | | | | | | |
|---|---|---|---|---|---|---|---|---|---|---|---|---|
| X | | | 9 | 0 | 8 | 1 | 9 | 0 | 0 | 0 | 0 | 0 |
| Y | | | 1 | 0 | 0 | 0 | 0 | 0 | 1 | 2 | 1 | 2 |
| SUM | + | ← | 0 | 0 | 8 | 1 | 9 | 0 | 1 | 2 | 1 | 2 |
| X | SHIFT | | 0 | 8 | 1 | 9 | 0 | 1 | 2 | 1 | 2 | 0 |
| Y | − | | 1 | 0 | 0 | 0 | 0 | 0 | 1 | 2 | 1 | 2 |
| DIFFERENCE | | ← | 9 | 8 | 1 | 9 | 0 | 1 | 0 | 9 | 0 | 8 |
| X | SHIFT | | 8 | 1 | 9 | 0 | 1 | 0 | 9 | 0 | 8 | 0 |
| Y | + | | 1 | 0 | 0 | 0 | 0 | 0 | 1 | 2 | 1 | 2 |
| SUM | | | 9 | 1 | 9 | 0 | 1 | 1 | 0 | 2 | 9 | 2 |
| Y | + | | 1 | 0 | 0 | 0 | 0 | 0 | 1 | 2 | 1 | 2 |
| SUM | | ← | 0 | 1 | 9 | 0 | 1 | 1 | 1 | 5 | 0 | 4 |
| X | SHIFT | | 1 | 9 | 0 | 1 | 1 | 1 | 5 | 0 | 4 | 0 |
| Y | − | | 1 | 0 | 0 | 0 | 0 | 0 | 1 | 2 | 1 | 2 |
| DIFFERENCE | | | 0 | 9 | 0 | 1 | 1 | 1 | 3 | 8 | 2 | 8 |
| Y | − | | 1 | 0 | 0 | 0 | 0 | 0 | 1 | 2 | 1 | 2 |
| DIFFERENCE | | ← | 9 | 9 | 0 | 1 | 1 | 1 | 2 | 6 | 1 | 6 |
| X | SHIFT | | 9 | 0 | 1 | 1 | 1 | 2 | 6 | 1 | 6 | 0 |
| Y | + | | 1 | 0 | 0 | 0 | 0 | 0 | 1 | 2 | 1 | 2 |
| SUM | | ← | 0 | 0 | 1 | 1 | 1 | 2 | 7 | 3 | 7 | 2 |
| X | SHIFT | | 0 | 0 | 1 | 1 | 1 | 2 | 7 | 3 | 7 | 2 |

MP = 09181
$\overline{MP}$ = 90819
MC = 01212
PR = 11127372

← ARROW INDICATES AN END CARRY.

FIG. 13

EXAMPLE OF DIVISION

| | | | | | | | | | | | | |
|---|---|---|---|---|---|---|---|---|---|---|---|---|
| X | | | 9 | 8 | 8 | 8 | 7 | 2 | 6 | 2 | 8 | 0 |
| Y | + | | 0 | 1 | 2 | 1 | 2 | 0 | 0 | 0 | 0 | 1 |
| SUM | | ← | 0 | 0 | 0 | 9 | 9 | 2 | 6 | 2 | 8 | 1 |
| X | SHIFT | | 0 | 0 | 9 | 9 | 2 | 6 | 2 | 8 | 1 | 0 |
| Y | − | | 0 | 1 | 2 | 1 | 2 | 0 | 0 | 0 | 0 | 1 |
| DIFFERENCE | | ← | 9 | 9 | 7 | 8 | 0 | 6 | 2 | 8 | 0 | 9 |
| X | SHIFT | | 9 | 7 | 8 | 0 | 6 | 2 | 8 | 0 | 9 | 0 |
| Y | + | | 0 | 1 | 2 | 1 | 2 | 0 | 0 | 0 | 0 | 1 |
| SUM | | | 9 | 9 | 0 | 1 | 8 | 2 | 8 | 0 | 9 | 1 |
| Y | + | | 0 | 1 | 2 | 1 | 2 | 0 | 0 | 0 | 0 | 1 |
| SUM | | ← | 0 | 0 | 2 | 3 | 0 | 2 | 8 | 0 | 9 | 2 |
| X | SHIFT | | 0 | 2 | 3 | 0 | 2 | 8 | 0 | 9 | 2 | 0 |
| Y | − | | 0 | 1 | 2 | 1 | 2 | 0 | 0 | 0 | 0 | 1 |
| DIFFERENCE | | | 0 | 1 | 0 | 9 | 0 | 8 | 0 | 9 | 1 | 9 |
| Y | − | | 0 | 1 | 2 | 1 | 2 | 0 | 0 | 0 | 0 | 1 |
| DIFFERENCE | | ← | 9 | 9 | 8 | 7 | 8 | 8 | 0 | 9 | 1 | 8 |
| X | SHIFT | | 9 | 8 | 7 | 8 | 8 | 0 | 9 | 1 | 8 | 0 |
| Y | + | | 0 | 1 | 2 | 1 | 2 | 0 | 0 | 0 | 0 | 1 |
| SUM | | ← | 0 | 0 | 0 | 0 | 0 | 0 | 9 | 1 | 8 | 1 |
| X | SHIFT | | 0 | 0 | 0 | 0 | 0 | 0 | 9 | 1 | 8 | 1 |

← ARROW INDICATES AN END CARRY.

11127372 ÷ 01212 = 09181
$\overline{DD}$ = 88872628

INVENTOR.
WILLIAM H. BURKHART
BY Charles L. Johnson Jr.
ATTORNEY 3,249,745

TWO-REGISTER CALCULATOR FOR PERFORMING MULTIPLICATION AND DIVISION USING IDENTICAL OPERATIONAL STEPS

William H. Burkhart, Short Hills, N.J., assignor to Monroe International Corporation, a corporation of Delaware Filed Jan. 9, 1962, Ser. No. 165,159
12 Claims. (Cl. 235—160)

This invention relates generally to calculators and more particularly to an improved two-register calculator for performing multiplication and division.

Calculating apparatus of various types has been developed to carry out the arithmetic operations required by modern business and scientific establishments. In varying degrees this apparatus is complex, expensive and individualistically designed for the particular arithmetic operation to be performed. Therefore the ultimate in computing apparatus would be a machine having a minimum of component parts which would be able to carry out, in an acceptable time span, all of the computational operations desired. The use of a given set of parts acting in a given way to produce the results of more than one type of computation will of course act to minimize the number of component parts. It is to the partial solution of this ultimate goal that this invention is directed. More specifically the invention is directed to providing a two-register calculating apparatus whereby either the arithmetic operations of multiplication or division may be performed by carrying out identical operational steps.

It is therefore a broad object of the invention to provide an improved computing method and apparatus.

It is a further object of the invention to provide an improved multiplier-divider.

It is a still further object of the invention to provide an improved multiplier-divider capable of performing either computation with substantially identical components and operational steps.

It is an important feature of the invention that only two signal channels are required to divide or multiply by following identical steps.

It is another feature of the invention that the above is accomplished with a minimum of component parts, the significant ones being two registers, one of which serves as an accumulator, the other as a memory register.

These and other objects and novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

Figure 3:
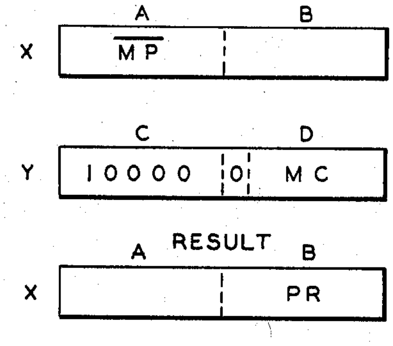
Figure 4:
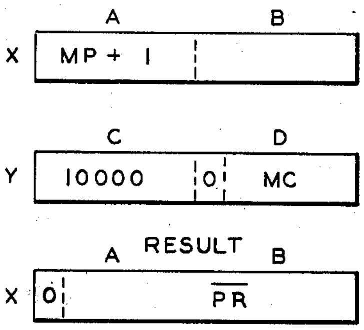
Figure 5:
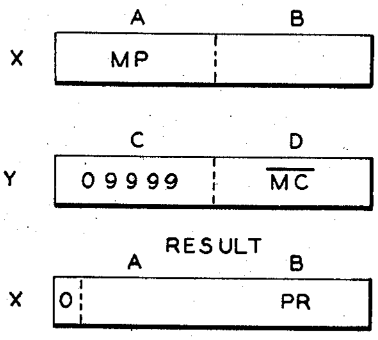

FIGS. 3, 4, and 5 represent various placements of factors and product in carrying out the operation of multiplication.

Figure 6:
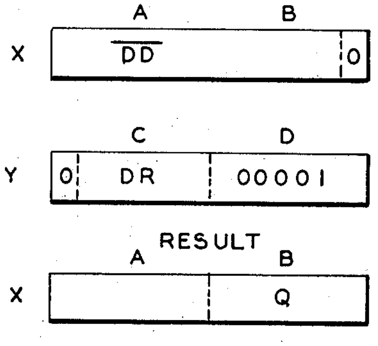
Figure 7:
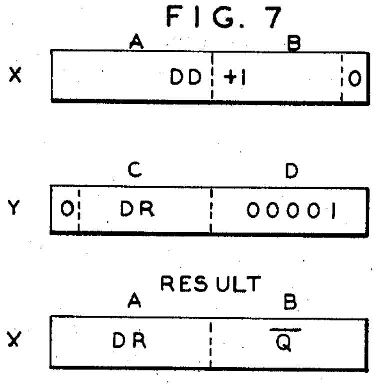
Figure 8:
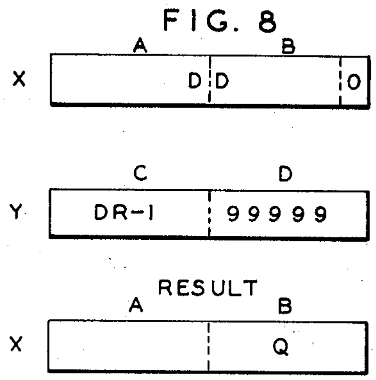

FIGS. 6, 7, and 8 represent various placements of quantities and quotient in carrying out the operation of division.

Figure 9:
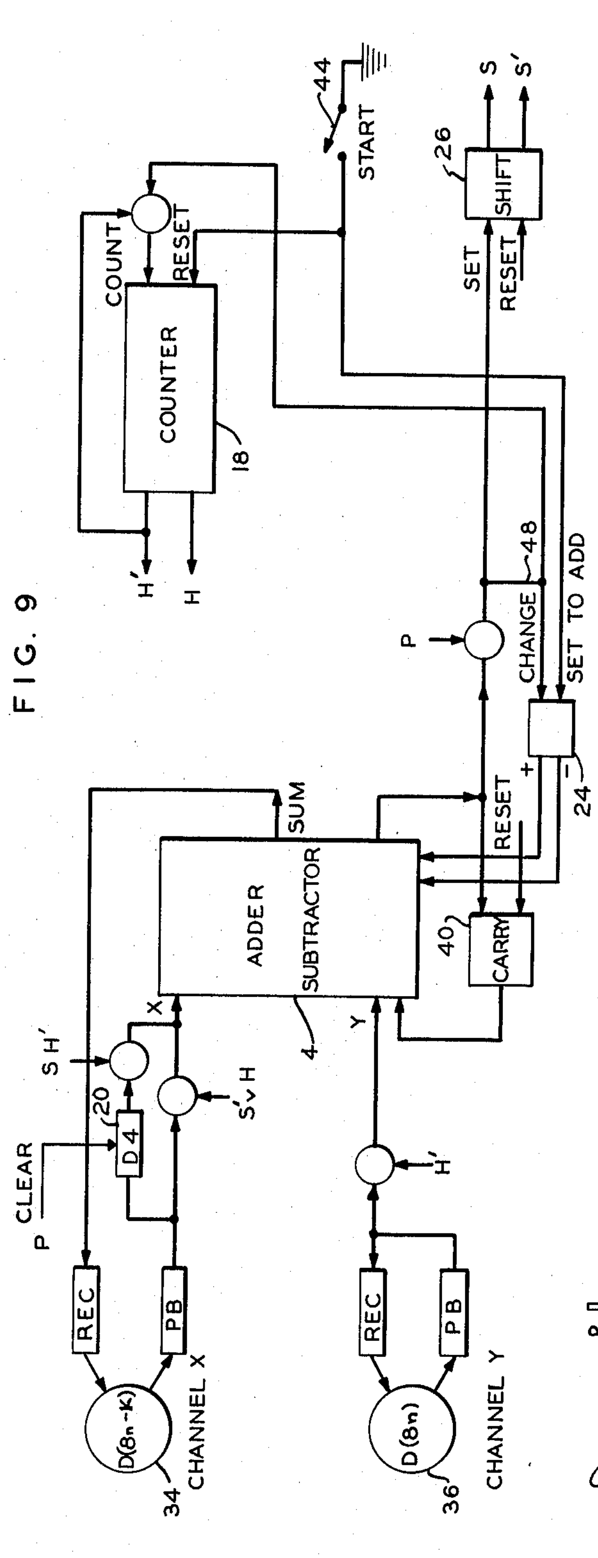

FIG. 9 is a block diagram of one embodiment of the invention.

Figure 10:
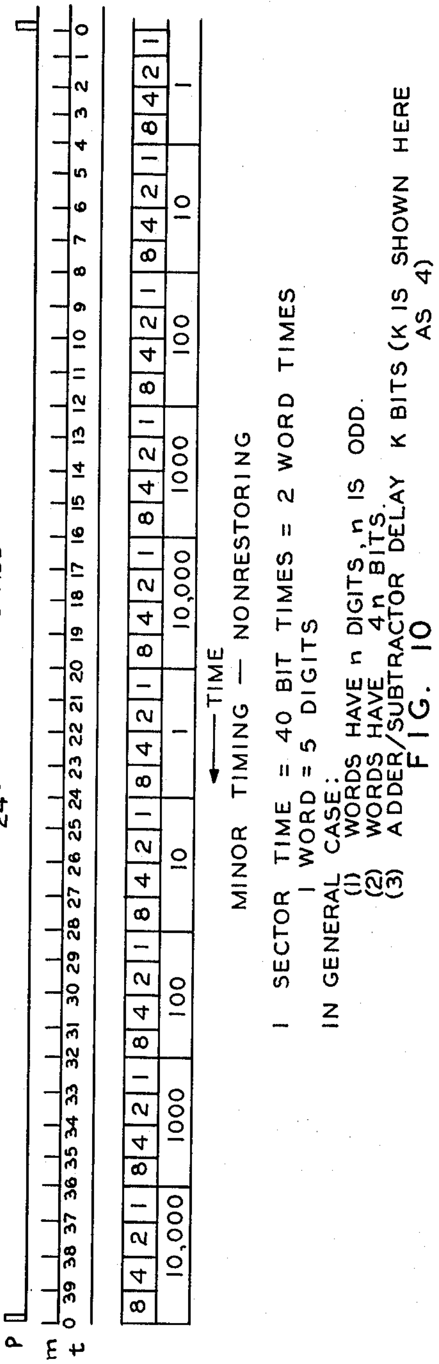

FIG. 10 is a timing chart of the nonrestoring minor timing operation.

Figure 11:
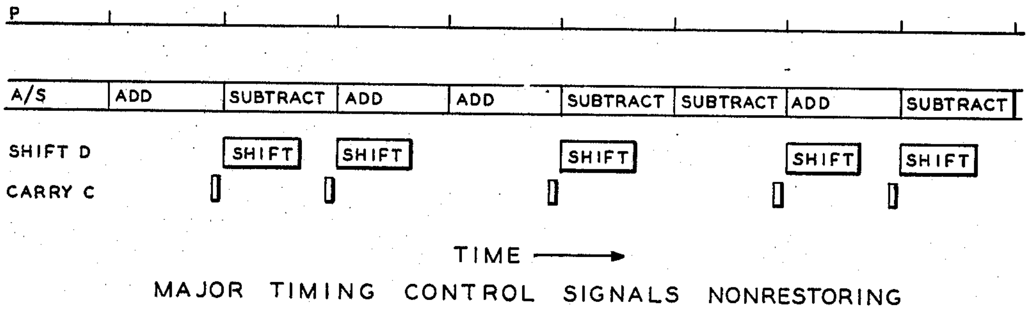

FIG. 11 is a timing chart of the nonrestoring major timing operation.

FIG. 12 illustrates the operation of the invention in performing multiplication.

FIG. 13 illustrates the operation of the invention in performing division.

Figure 1:
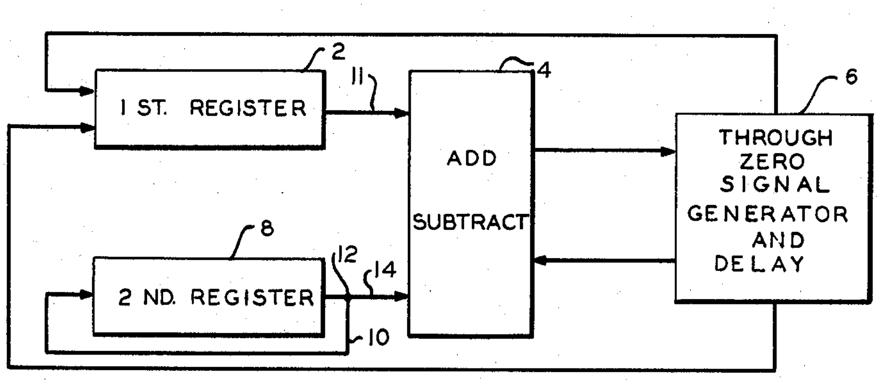
FIG. 1 is a simplified block diagram of one embodiment of the invention.

The simplified block diagram of FIG. 1 illustrates generally the signal flow while carrying out the multiplication or division steps. Referring to FIG. 1 it may be seen that the signals in the first register 2 are shifted through one input 11 of the add-subtract mechanism 4, the add-subtract output being transmitted to the through zero signal generator and delay unit 6 and back to the first register. A second signal path includes the second register 8 which continuously regenerates the second register signals by way of conductor 10. These signals are sampled at junction 12 and fed by way of input connection 14 as the second input to the add-subtract mechanism 4. The through zero signal generator and delay apparatus 6 generates a signal to switch the add-subtract mechanism from performing addition to performing subtraction or vice versa whenever the high order signal changes, i.e., from 9 to 0 or 0 to 9 respectively, in a decimal system. Thus the occurrence of a "carry" in addition or a "borrow" in subtraction causes the mechanism to shift from one operation to the other. The apparatus 6 also generates a control signal which causes the first register signals to be delayed or shifted, thereby allowing the multiplication or division computation to continue.

Figure 2:
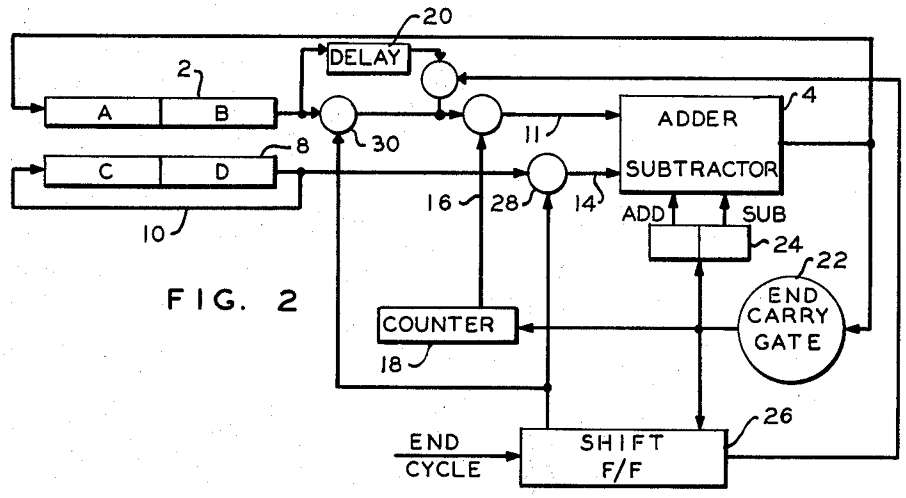
FIG. 2 represents a more detailed block diagram of the invention.

The expanded block diagram of FIG. 2 may be used to further illustrate the operation of the invention. In this embodiment two information registers of two information words each provide signal storage. The first register 2 will comprise two storage words which shall be designated A and B while the second register 8 will comprise two storage words which will shall be designated C and D. Throughout the specification the complement of a number should be understood to be the result of subtracting the number from zero, i.e., in a decimal system the complement of 17 in a 4 digit machine is 9983. The complement of a quantity will be designated as the quantity with a horizontal line over it. For example the multiplier will be abbreviated as MP and the complement of the multiplier will be designated as $\overline{MP}$. Other abbreviations used will be MC representing multiplicand; PR representing product; DD representing dividend; DR representing divisor and; Q representing quotient.

Referring again to FIG. 2 the basic operation of the invention will be described. The A and B storage words are continuously regenerated or circulated through the adder 4 upon receipt of the RUN signal on conductor 16 from the counter 18. The delay unit 20 is not operative at this time. The C and D storage words are continuously regenerated through the register 8 and applied to the adder 4 by way of conductor 14. The end carry gate 22 switches the add/subtract flip-flop 24 so as to cause the add-subtract unit 4 to alternately change from add to subtract and subtract to add upon receipt of each end carry signal. The shift flip-flop 26 applies a signal to the switch member 28 to cut off the C and D words from the add-subtract member 4 and applies a shift signal to the switch 30 so as to pass the A and B signal through the delay member 20 thereby causing a relative one digit shift between the AB and CD words.

Still referring to FIG. 2 the computational steps comprise (1) setting the add-subtract flip-flop 24 to "add,"
(2) circulating the AB and CD words until an end carry signal is generated which changes the add-subtract flip-flop,
(3) setting the "shift" flip-flop, going through one shift cycle, and counting 1, and
(4) if the count has reached a number equal to the digit capacity of the multiplier or quotient stop, but should the count be smaller, repeat the above described step (2).

For proper operation of the invention for multiplication and division by carrying out identical procedural steps, correct placement of the factors and quantities involved is necessary. Such placements are shown in FIGS. 3 and 6.

FIG. 3 illustrates an arrangement in which the reciprocal of the multiplier is placed in the A register, the multiplicand in the D register, 10000 in the C register and the product emerges in the B register.

There are no limits on MP and MC except that the product must be less than $2n-1$ digits in length (i.e., $PR<10^{2n-1}$) and MP must not be equal to zero, $n$ being the number of digits per word.

FIG. 6 shows an embodiment of division by the invention, in which the reciprocal of the dividend is placed in register A, the divisor in register C and 00001 in register D and in which the quotient develops in the B register.

Referring now to FIG. 9, a block diagram of an embodiment of the nonrestoring multiplier-divider, it is first assumed that the embodiment operates in the decimal mode and the number of decimal digits per word is odd. The operation will first be described in terms of the multiplication function.

The source of numbers as shown in FIG. 9 is two drum channels, each containing roughly two words. The first channel 34, labeled $D(8n-K)$, contains $8n-K$ bits where $n$ is the number of decimal digits per word and K is the number of bits per digit. In the specific examples given here, $n=5$ and $K=4$, and the channel contains thirty-six bits of storage. Since the adder/subtractor 4 is assumed to offer a delay of K bit times between input and output, the entire loop, containing the channel 34, and the adder/subtractor is a regeneration loop of delay $8n$ or 40 bit times. During shift, when the D4 delay 20, containing K bits of delay, is added to this loop, the total delay is $9n$ or 44 bit times and numbers passing through it are multiplied by 10 on each cycle. This is equivalent to shift left. The remaining channel 36, labeled $D(8n)$, is a regeneration channel with 40 bits of storage.

Referring to FIGS. 3, 9, 10, and 11 it is further assumed that channel X contains the complement of the multiplier $\overline{MP}$, at the high order end, and the decimal point is assumed to be between the $n$th and $n+1$ digits so that the multiplier is an integer. The low order end of this loop contains zeros, and it is here that partial products will begin to accumulate. As the successive $\overline{MP}$ digits are used up, the $\overline{MP}$ will be shifted left to make room for the growing product. The high order end of the Y loop contains the number 10000, that is, a decimal 1 in its highest order position. The low order end of loop Y contains the multiplicand justified to the right as an integer; it must have a zero in its highest order position. It is also assumed that the carry and shift flip-flops 40 and 26 are reset. When the start button 44 is depressed, the add/subtract flip-flop 24 is set to add and the counter 18 sets to zero upon occurrence of the first $p$ pulse. This gives us the not halt signal (H'), which allows the Y loop contents to enter the adder 4. On the first cycle, the multiplicand is added into the channel X, and a 1 is added to the high order end of $\overline{MP}$, causing the 9 contained therein to go to zero and produce an end carry, assuming MP was a four-digit number. This end carry, when fed to a coincidence gate with $p$, serves to set shift flip-flop 26, and to supply a count pulse to the counter advancing it to count 1. Simultaneously, $p$ and carry on conductor 48 trip the center-fed add-subtract flip-flop 24, setting it now to subtract. Note at this point that it does not matter whether the last incorrect sum digit is corrected. This is because that last digit, though possibly recorded incorrectly, will never be played back to the adder. The reason is that the next cycle will be a shift cycle using the delay D4. The incorrect digit will then be in the delay 20 at the end of the next word time, and will be cleared at that $p$ time. The end carry which entered the carry flip-flop 40 does not stay long because $p$ resets the carry flip-flop, thus preventing end carries from corrupting the low order end of subsequent numbers.

On the second cycle we shall subtract and shift simultaneously through the use of the delay 20. The shift flip-flop 26, set at $p$ time, gates the now clear delay into the adder, yielding a zero followed by shifted digits of the partial product and the $\overline{MP}$. On this cycle the MC and 10000 are subtracted yielding a new partial product and possibly an end carry. If no end carry is produced, the shift flip-flop is reset, and on the next cycle the $\overline{MP}$ will arrive again unshifted and in time with the 10000 from channel Y. Further subtractions will occur until finally this second digit of $\overline{MP}$ has been reduced through 0 to 9 and a carry has been produced. In the latter case the add-subtract flip-flop 24 is set to add and the shift flip-flop 26 is set.

On the next add cycle 10000 is added to the third digit of $\overline{MP}$, now the highest order digit, repeatedly until another carry is produced. The process continues with the counter 18 counting each end carry. In this example there are 5 $\overline{MP}$ digits and hence, five end carries. It follows that count 5 rises at the end of the last add sequence, i.e., when the product is complete, and serves to stop further counting at its own input gate as well as to stop Y channel numbers from entering the adder/subtracter. Further, the halt command, H or count 5, opens the regeneration gate in channel X, allowing the product to circulate through the adder/subtracter 4 indefinitely despite the existence of a shift signal S.

An examination of the multiplication example given in FIG. 12 shows clearly the formation of partial products in a nonrestoring fashion.

The operation of the apparatus of FIG. 9 will now be described when performing division again assuming $n$ is odd.

In division, referring to FIG. 6 channel X is loaded with the complement of the dividend, $\overline{DD}$; this number may have up to $2n-1$ digits occupying all but the last low order position, the low order position being zero.

Channel Y contains the divisor DR in its high order end. A zero must be present in the highest position so that the divisor is limited to $n-1$ significant digits. At the low order end of channel X we place a 1. The quotient will be formed in the low order half of channel X by insertion of 1's into its lowest order position, and as the $\overline{DD}$ shifts left, the quotient digits will occupy spaces abandoned by the $\overline{DD}$.

There is a constraint on the selection of the dividend and divisor in that they be chosen such that the quotient will not exceed the capacity of the low order half of channel X, the B register. Stated alternatively, DD must be less than $10^n$ DR. A further constraint is that neither DD nor DR may be zero.

If the divisor does not divide evenly into the dividend then there will be a remainder in the A register and the quotient will be rounded upwards. For instance if DD is 12 and DR is 9, then Q will be 2 and if, DD is 120 and DR is 9, then Q will be 14.

The first cycle of division proceeds exactly as does the first cycle of multiplication, all the flip-flops have been set in exactly the same way. The difference between division and multiplication is wholly explained by the different interpretation we put on the register contents. Since the first cycle is addition, the first quotient digit will be a 1 and DR added to $\overline{DD}$. The process will continue until the number of additions is sufficient to cause $\overline{DD}$ to go positive, at which time an end carry signals a shift and sets the adder/subtracter to subtract. During the subtract cycles, 1's are successively subtracted from the now excessive quotient, while divisors are allowed to reduce the positive remainder. End carry finally signals a negative remainder, and after shift the process is continued with addition.

As mentioned earlier, all controls work in the same way for both multiplication and division; therefore, the counting process for determining completion of the quotient goes on exactly as it did in multiplication, and since the quotient and remainder are in loop X, they will continue to regenerate as long as H remains high.

An examination of the division example shown in FIG. 13 shows the values arising during a division operation.

Adder/subtracters of the commercially available type may be used in practicing the invention, one example being described at pages 270–278 of Logical Design of Digital Computers by Montgomery Phister Jr., published by John Wiley & Sons in 1958.

The circuits shown perform multiplication and division when the registers are filled as just described and as shown at FIGS. 3 and 6.

Note that where the channels are $2n$ digits long ($n$ is odd) DR and MC are limited to $n-1$ digits, while Q and MP may be $n$ digits, and DD and PR are of course $n+n-1=2n-1$ digits, maximum.

The invention is not limited to the use of registers loaded as just described. Instead we may place DD, DR, and 99999 in place of 00001 in the channels X and Y respectively, and initiate division with a subtract cycle, then shift, add, shift, subtract, etc., producing Q as a result.

Similarly, we may utilize DD, $\overline{DR}$, and 00001, initiate division with an add cycle and suppress end carries while watching for "no-carry" as a signal to shift and set Q as a result.

Another variation is to use DD, DR, 00001, initiate with a subtract cycle, and get $\overline{Q}$ as a result. It is necessary to complement $\overline{Q}$ to get the true quotient when finished.

It should be apparent to anyone skilled in the art that for each of these methods, an analog exists for multiplication. For example, if the complement of 10000 (90000) is used for augmenting the MP and the *lack* of end carry is used as a shift signal, we may start with MP–1, MC, and 90000 and derive PR all in uncomplemented form. This is the analog of DD, DR, 00001, and Q mentioned previously.

It should also be apparent to anyone skilled in the art that it is possible to invoke similar rules and configurations for registers in which the number of digits $n$ is even.

It is perhaps important to note that all previous machines known use analogs based upon MP–Q, MC–DR, DD–PR similarity; that is, these figures always occupied the same registers. All the methods proposed here use a different analogy—based upon similarity of arithmetic operations—wherein DD–MP, DR–MC, Q–PR are interchangeable.

It should be noted that all these methods are applicable to restoring division as well. The advantage of restoring division is that one can stop on any cycle and never find a negative remainder as occurs here.

Restoring multiplication and division may be accomplished by the apparatus of FIG. 9 by following the steps outlined below:

(1) Change the Add/Subtract flip-flop 24 if there is an end carry. Start with subtraction on the first cycle.
(2) Set the Shift flip-flop 26 if there is an end carry from addition only, i.e., after restoring a negative $\overline{DD}$ or $\overline{MP}$. Reset with $p$ otherwise.
(3) No change in the counter.

Restoring operation can be described in relation to FIGS. 4, 5, 7, and 8.

In FIG. 4 the operation starts with the multiplier plus one in the A word register, the multiplicand in the D register and 10000 in the C register. With such an initial setting the complement of the product will progress from right to left beginning at the right-hand side of the B register representation.

FIG. 5 shows another placement of factors in which the multiplier is placed in the A register, the complement of the multiplicand in the D register, 09999 in the C register and the product progresses from right to left in the B register. FIG. 5 is carried out operationally by shifting the multiplier to the left end of the AB register, complementing the multiplicand to the full length of the CD register, subtracting AB–CD until negative, restore, shift, repeat, and stopping when the multiplier is reduced to zero.

FIG. 7 illustrates one arrangement wherein the dividend plus one is placed in the AB register, the divisor in the C register, 00001 in the D register and the complement of the quotient appears in the B register as the division operation proceeds.

FIG. 8 illustrates a division operation wherein the dividend is placed in the AB register, the divisor minus one is placed in the C register, and 99999 is placed in the D register. Then, as in the multiplication description relative to FIG. 5, the CD register is subtracted from the AB register until negative, the quantity restored, shifted and the process repeated until the quotient is a half register in length.

It is thus seen that a multiplier divider has been shown and described which fulfills the objects enumerated previously.

It is important to note that the invention is not limited to the specific embodiments shown but that the invention is intended to encompass a mechanical type apparatus in which the functions described are carried out mechanically and in which the various features are incorporated. These features include a multiplier-divider in which the result either the product or quotient is obtained in one accumulator.

It should also be noted that the adder could be binary as well as decimal and the registers could be shift registers, drums or other well-known types. The delay D4 of FIG. 9 may be a D1 or one bit delay if the machine were binary.

It should be understood that this invention is not limited to specific details of construction and arrangement thereof herein illustrated, and that changes and modifications may occur to one skilled in the art without departing from the spirit of the invention; the scope of the invention being set forth in the following claims.

What is claimed is:

1. Computing apparatus for performing the operations of multiplication or division upon two operands according to the same operational steps comprising: accumulator means for storing a first operand and a resultant product or quotient; first input means coupled to said accumulator means for entering said first operand therein; recirculating storage means for storing a second operand and a preset value; second input means coupled to said recirculating storage means for entering said second operand therein; presetting means coupled to said recirculating storage means for entering a preset value into a preset position of said recirculating storage means according to the operation to be performed; and add/subtract means having inputs coupled respectively to said accumulator means and said recirculating storage means and further having an output coupled to said accumulator means; said add/subtract means causing a multiplication or division operation to be performed on said first and second operands by the selective addition and subtraction of said first and second operands and for causing the resultant product or quotient to be entered into said accumulator means.

2. Computing apparatus as defined in claim 1 further comprising a carry/borrow detector coupled to said add/subtract means for producing signals indicative of the occurrence of a carry or borrow from said add/subtract means and connecting means coupled between said detector and said add/subtract means to cause said add/ subtract means to switch between add and subtract in accordance with said signals.

3. Computing apparatus for performing multiplication upon two operands comprising: accumulator means for storing a multiplier operand and a resulting product; first input means coupled to said accumulator means for entering said multiplier operand therein; recirculating storage means for storing a multiplicand operand and a preset value; second input means coupled to said recirculating storage means for entering said multiplicand operand therein; presetting means coupled to said recirculating storage means for entering a preset value into a preset position of said recirculating storage means; and add/subtract means having inputs coupled respectively to said accumulator means and said recirculating storage means and further having an output coupled to said accumulator means; said add/subtract means causing multiplication to be performed on said multiplier and multiplicand operands by the selective addition and subtraction of said operands and for causing the resultant product to be entered into said accumulator means.

4. Computing apparatus for performing division upon two operands comprising: accumulator means for storing a dividend operand and a resulting quotient; first input means coupled to said accumulator means for entering said dividend operand therein; recirculating storage means for storing a division operand and a preset value; second input means coupled to said recirculating storage means for entering said division operand therein; presetting means coupled to said recirculating storage means for entering a preset value into a preset position of said recirculating storage means; and add/subtract means having inputs coupled respectively to said accumulator means and said recirculating storage means and further having an output coupled to said accumulator means; said add/subtract means causing division to be performed on said dividend and divisor operands by the selective addition and subtraction of said operands and for causing the resultant quotient to be entered into said accumulator means.

5. Computing apparatus for performing multiplication or division according to identical operational steps comprising: accumulator means for temporarily retaining first numerical indica and for accumulating the results of addition and subtraction operations; a numerical storage register for temporarily retaining second numerical indicia; add/subtract means having two input terminals and an output terminal; first coupling means for coupling said accumulator means to a first of said two input terminals of said add/subtract means; second coupling means for coupling said numerical storage register to the second of said two input terminals of said add/subtract means; third coupling means for coupling said output terminal of said add/subtract means to said accumulator means; said first, second and third coupling means permitting the entry of indicia stored in said accumulator means and said storage means into said add/subtract means and the entry of the results from said add/subtract means into said accumulator means; detector means coupled to said add-subtract means to detect when a portion of the first numerical indicia from said accumulator means goes through the zero value and produce a signal indicative thereof; shift means coupled to said accumulator means, said storage register and said detector means and responsive to the signal produced by said detector means to shift the denomination significance of the numerical indica therein with respect to each other; and control means coupled to said add/subtract means and said detector means to cause the add/subtract means to alter its operation between add and subtract at substantially the same time as said numerical indicia is being shifted.

6. Computing apparatus as defined in claim 5 wherein said shift means comprises: two terminal delay means; selectively operable gating means coupled between said accumulator means and a first terminal of said delay means and fourth coupling means coupling the second of said two terminals of said delay means to the first terminal of said add/subtract means; said selectively operable gating means responsive to said signal produced by said detector means to cause the shifting of the denominational significance of the indicia in said accumulator means with respect to the indicia in said storage register.

7. Computing apparatus for performing the operations of multiplication or division upon two operands according to the same operational steps comprising: accumulator means for storing a first operand and a resultant product or quotient; first input means coupled to said accumulator means for entering said first operand therein; recirculating storage means for storing a second operand and a preset value; second input means coupled to said recirculating storage means for entering said second operand therein; presetting means coupled to said recirculating storage means for entering a preset value into a preset position of said recirculating storage means according to the operation to be performed; add/subtract means having inputs coupled respectively to said accumulator means and said recirculating storage means and further having an output coupled to said accumulator means, said add/subtract means causing a multiplication or division operation to be performed on said first and second operands by the selective addition and subtraction of said first and second operands and for causing the resultant product or quotient to be entered into said accumulator means; detector means coupled to said add/subtract means to detect when the output from said add/subtract means goes through zero and produce a signal indicative thereof; control means coupled to said detector means and said add/subtract means to switch said add/subtract means between add and subtract in response to said signal; and second control means coupled to said accumulator means and said detector means for multiplying said first operand by its radix in response to said signal, whereby the operation performed depends entirely upon the original placement of the operands in said accumulator means and said recirculating storage means and the preset value placed in said recirculating storage means.

8. Apparatus for performing the operations of division and multiplication comprising: a first register for the dividend and quotient or multiplier and product respectively, a second register for the divisor or multiplicand, an adder-subtracter circuit having a first (augend-minuend) input, a second (addend-subtrahend) input and a sum-difference output, the output of said first register being connected to said adder-subtracter first input, the input to said first register being connected to said adder-subtracter output, the output of said second register being connected to said adder-subtracter second input, means for producing a signal when the output from said adder-subtracter goes through zero, means for controlling said adder-subtracter to either add or subtract in response to said through-zero signals to cause said adder-subtracter to do the alternate operation, means for multiplying the contents of said first register by the radix of the number system in use in response to the said through-zero signals and counting means for counting certain of said through-zero signals and for terminating the operation when said counter reaches a predetermined count, whereby the nature of the operation performed, be it multiplication or division, depends entirely upon the original placement of the numbers in the first and second registers.

9. The apparatus as set forth in claim 8 wherein said counter counts only through-zero signals when said adder-subtracter is performing addition.

10. The apparatus as set forth in claim 8 wherein said counter counts only through-zero signals when said adder-subtracter is performing subtraction.

11. Apparatus for performing the operations of division and multiplication comprising: a first register for the dividend and quotient or multiplier and product respectively, a second register for the divisor or multiplicand, an adder-subtracter circuit having a first (augend-minuend) input, a second (addend-subtrahend) input and a sum-difference output, the output of said first register being connected to said adder-subtracter first input, the input to said first register being connected to said adder-subtracter output, the output of said second register being connected to said adder-subtracter second input for a division operation, said first register initially contains the dividend or the complement thereof with its least significant digit as the next to the least significant digit of said first register, said second register containing the divisor or the complement thereof in the more significant half, the digit 1 at the least significant position or the complement of the digit 1 as the less significant half, said second register having a zero at its most significant position, and at the conclusion of said operation, said first register contains the quotient or the complement thereof as the less significant half, only one of the said four quantities dividend, divisor, digit 1 or quotient being in complement form, means for producing a signal when the output from said adder-subtracter goes through zero, means for controlling said adder-subtracter to either add or subtract in response to said through-zero signals to cause said adder-subtracter to do the alternate operation and means for multiplying the contents of said first register by the radix of the number system in use in response to the said through-zero signals whereby the nature of the operation performed, be it multiplication or division, depends entirely upon the original placement of the numbers in the first and second registers.

12. Apparatus for performing the operations of division and multiplication comprising: a first register for the dividend and quotient or multiplier and product respectively, a second register for the divisor or multiplicand, an adder-subtracter circuit having a first (augend-minuend) input, a second (addend-subtrahend) input and a sum-difference output, the output of said first register being connected to said adder-subtracter first input, the input to said first register being connected to said adder-subtracter output, the output of said second register being connected to said adder-subtracter second input for a multiplication operation, said first register initially contains the multiplier or the complement thereof as the more significant half, said second register containing the multiplicand or the complement thereof with its least significant digit as the least significant digit of said second register and the digit 1 at the most significant position or the complement of the digit 1 as the more significant half, and at the conclusion of said operation, said first register contains the product or the complement thereof and a zero at its most significant position, only one of said four quantities multiplier, multiplicand, digit 1 or product being in the complement form, means for producing a signal when the output from said adder-subtracter goes through-zero, means for controlling said adder-subtracter to either add or subtract in response to said through-zero signals to cause said adder-subtracter to do the alternate operation and means for multiplying the contents of said first register by the radix of the number system in use in response to the said through-zero signals whereby the nature of the operation performed, be it multiplication or division, depends entirely upon the original placement of the numbers in the first and second registers.

References Cited by the Examiner

UNITED STATES PATENTS

| | | | |
|---|---|---|---|
| 3,022,950 | 2/1962 | Dirks | 235—160 X |
| 3,031,139 | 4/1962 | Spingies et al. | 235—160 |
| 3,167,646 | 1/1965 | Giroux | 235—165 |

OTHER REFERENCES

Page 153, 1955, Richards, Arithmetic Operations in Digital Computers, Norstrand.

Page 48–51, December 1959, IBM Technical Disclosure Bulletin, "Divide Circuit," by J. Tai, vol. 2, No. 4.

ROBERT C. BAILEY, *Primary Examiner.*

MALCOLM A. MORRISON, *Examiner.*

E. M. RONEY, M. J. SPIVAK, *Assistant Examiners.*